US009618031B2

(12) United States Patent
Hyatt et al.

(10) Patent No.: US 9,618,031 B2
(45) Date of Patent: Apr. 11, 2017

(54) MOMENT RELIEF BARREL WASHER

(71) Applicant: United Technologies Corporation, Hartford, CT (US)

(72) Inventors: Thomas B. Hyatt, Cromwell, CT (US); Carl Brian Klinetob, East Haddam, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 62 days.

(21) Appl. No.: 14/668,209

(22) Filed: Mar. 25, 2015

(65) Prior Publication Data

US 2015/0300401 A1 Oct. 22, 2015

Related U.S. Application Data

(60) Provisional application No. 61/980,754, filed on Apr. 17, 2014.

(51) Int. Cl.
*F16B 43/02* (2006.01)
*F16B 43/00* (2006.01)

(52) U.S. Cl.
CPC .............. *F16B 43/00* (2013.01); *F16B 43/02* (2013.01)

(58) Field of Classification Search
CPC ......... F16B 43/02; F16B 43/002; F16B 43/00
USPC .................................................. 411/537–538
See application file for complete search history.

(56) References Cited

U.S. PATENT DOCUMENTS

| | | | | |
|---|---|---|---|---|
| 2,789,457 A * | 4/1957 | Allen | F16B 37/047 | 411/104 |
| 3,220,289 A * | 11/1965 | Farekas | B23Q 1/70 | 411/288 |
| 3,382,630 A * | 5/1968 | Chivers | E06B 3/5436 | 411/537 |
| 3,422,721 A * | 1/1969 | Yonkers | F16B 43/001 | 277/637 |
| 4,406,474 A * | 9/1983 | Scharf | F16B 43/02 | 280/154 |
| 4,854,798 A * | 8/1989 | Snyder | F16B 31/043 | 254/29 A |
| 5,203,656 A * | 4/1993 | McKinlay | F16B 39/282 | 411/149 |
| 5,545,230 A * | 8/1996 | Kinsinger | A61F 2/76 | 403/12 |
| 7,056,053 B2 * | 6/2006 | Schilling | F16B 43/02 | 285/412 |

(Continued)

*Primary Examiner* — Roberta Delisle
(74) *Attorney, Agent, or Firm* — Snell & Wilmer L.L.P.

(57) ABSTRACT

A barrel washer comprising a convex portion, a concave portion, the concave portion configured to mate with the convex portion, such that the convex portion is only capable of rocking along a single axis within the concave portion. The barrel washer may be configured to prevent a bolt from rotating within the barrel washer. The barrel washer may be configured to relieve bending stress on the bolt as well as extraction of the bolt from the barrel washer. A surface of the concave portion may be coated with a lubricant. A surface of the convex portion may be coated in a lubricant. The barrel washer may be configured to couple a bolt to a flange that is couple to another flange. The convex portion may comprise a rocker. The barrel washer may be configured relieve bending stress on the bolt as a first flange moves relative to a second flange.

18 Claims, 6 Drawing Sheets

204 C' 202 212 114 B' A A' B 206 208 C

(56) References Cited

U.S. PATENT DOCUMENTS 8,267,003 B1 * 9/2012 Lou .......................... F41H 5/013
89/36.08

* cited by examiner

TABLE 1

| CAN ROTATE ABOUT... | BARREL | SPHERICAL |
|---|---|---|
| A - A' | NO | YES |
| C - C' | NO | YES |
| B - B' | YES | YES |

TABLE 2

| CAN TRANSLATE ABOUT... | BARREL | SPHERICAL |
|---|---|---|
| A - A' | NO | NO |
| C - C' | NO | NO |
| B - B' | YES | NO |

MOMENT RELIEF BARREL WASHER

CROSS-REFERENCE TO RELATED APPLICATIONS

The application is a nonprovisional of, and claims priority to, and the benefit of U.S. Provisional Application No. 61/980,754, entitled "MOMENT RELIEF BARREL WASHER," filed on Apr. 17, 2014, which is hereby incorporated by reference in its entirety.

FIELD

The present disclosure relates to a moment relief washer, and more particularly, to a moment relief washer configured to prevent bolt deformation and/or loosening.

BACKGROUND

In some flanges that are bolted together, movement may be unavoidable. When flanges move relative to one another, a bolt coupling the flanges may be subjected to large moments, causing bending stress and/or movement in the bolt. When flanges move relative to one another, the bolt may experience cyclic bending stresses. These stresses may negatively affect the durability of the bolt as well as cause a reduction in the effectiveness of the bolt. Thus, there is a need for a washer that provides relief from these cyclic bending stresses.

SUMMARY

A barrel washer comprising a convex portion, a concave portion, the concave portion configured to mate with the convex portion, such that the convex portion is only capable of rocking along a single axis within the concave portion. The barrel washer may be configured to prevent a bolt from rotating within the barrel washer. The barrel washer may be configured to relieve bending stress, or a moment, on the bolt as well as rotation of the bolt about a bolt axis. A surface of the concave portion may be coated with a lubricant. A surface of the convex portion may be coated in a lubricant. The barrel washer may be configured to couple a bolt to a flange that is couple to another flange. The convex portion may comprise a rocker. The barrel washer may be configured relieve bending stress on the bolt as a first flange moves relative to a second flange as well as extraction of the bolt from the barrel washer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, a "concave" surface may comprise any surface having a cross-sectional profile that curves inward with respect to a reference plane.

As used herein, a "convex" surface may comprise any surface having a cross-sectional profile that curves outward with respect to a reference plane.

Figure 1A:
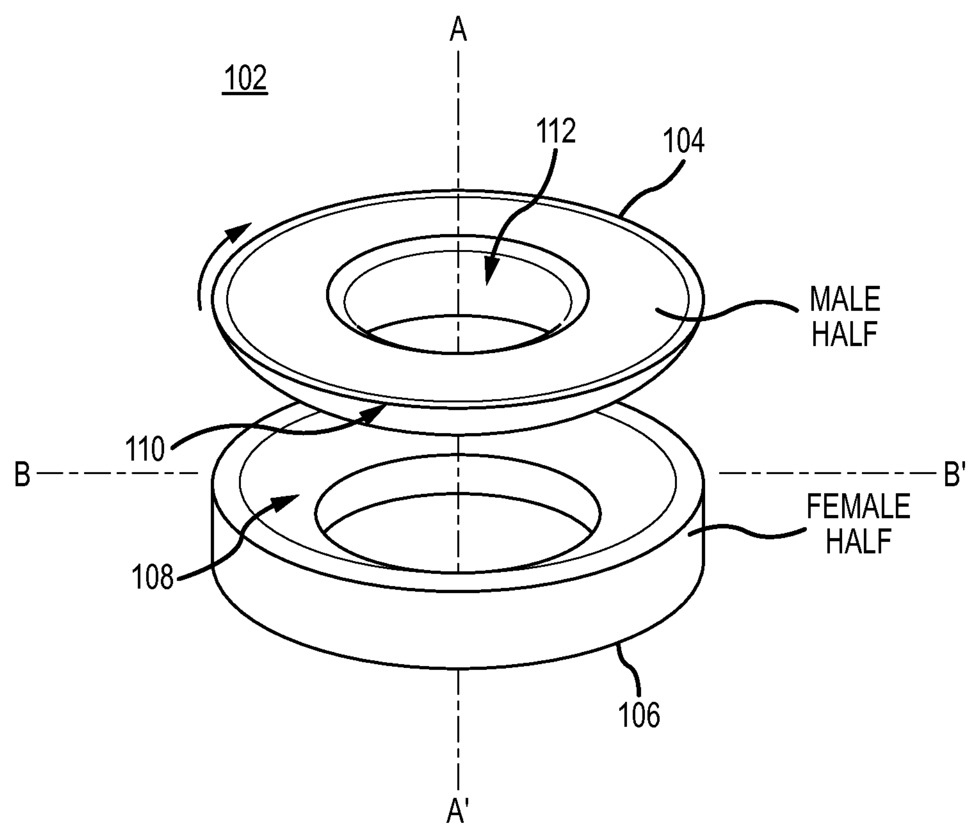
FIG. 1A illustrates an exploded view of a prior art spherical washer.

As described above, and with reference to FIG. 1A, a prior art "spherical" washer 102 (comprising a pair of annular discs) is depicted. Spherical washers 102 are constructed to relieve cyclic bending stresses, as described above and typically include a "male" half 104 and a "female" half 106. Each half 104 and 106 may fit together to form a spherical washer 102, through which a bolt may be inserted. As shown, the female half 106 may include a beveled or concave surface 108, while the male half may include a beveled or convex surface 110 configured to mate with the concave surface 108.

The spherical washer 102 may couple a bolt to a flange. More particularly, and as discussed below, the bolt may couple two flanges, and a spherical washer may couple the bolt to one or both flanges. Thus, the spherical washer 102 may, by design, permit relative movement (e.g., translational movement) between the flanges along a variety of axes in order to relieve bending stresses placed on the bolt as a result of motion of the flanges, as well as to permit relative motion between the flanges.

Figure 1B:
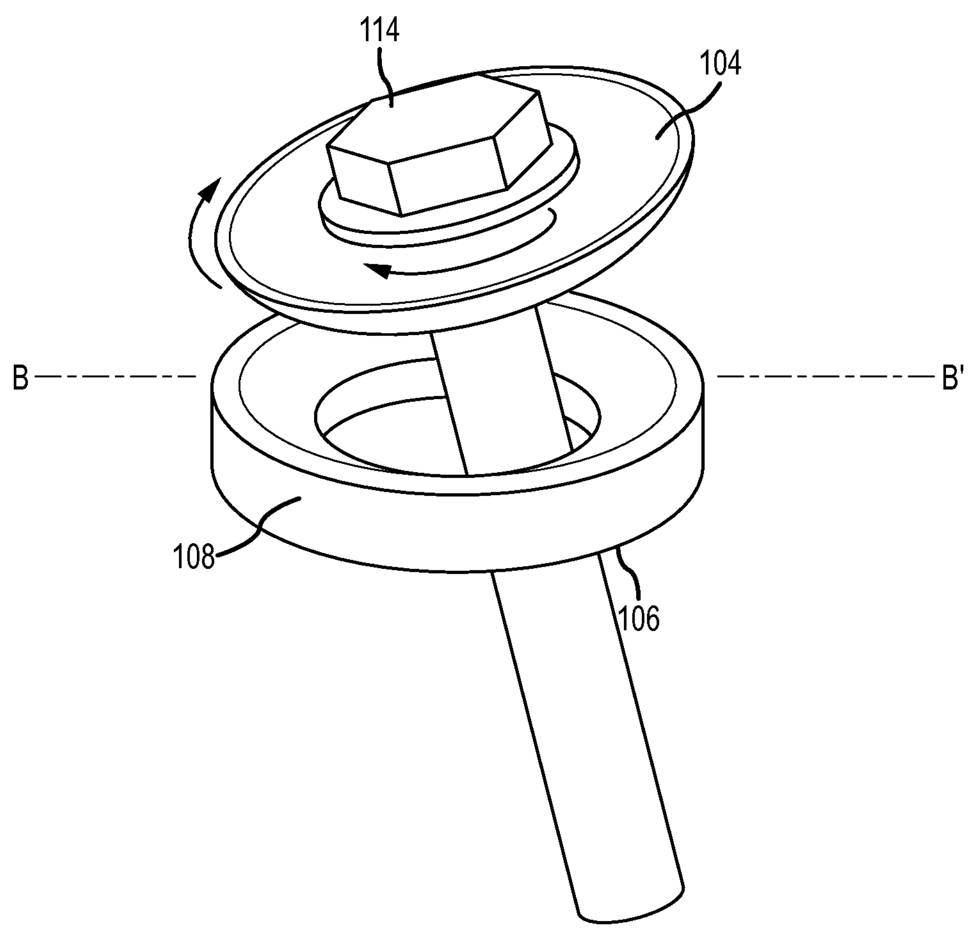
FIG. 1B illustrates an exploded view of a prior art spherical washer passed through by a bolt, the spherical washer permitting the bolt to rotate about several axes.

In operation, and with attention to FIG. 1B, the bolt 114 is inserted through the spherical washer 102 and be coupled to a flange through the washer. The spherical washer rotate about a variety of axes, such as about the axes A-A', B-B', C-C'.

In addition, the bolt 114 may be coupled to the male half 104 of the spherical washer 102 by a tertiary locking mechanism, such as any type of adhesive, pressure bonding, head bonding, welding, and the like. Therefore, as the male half 104 of the spherical washer rotates about the bolt axis (i.e., axis A-A'), the bolt 114 may rotate with the male half 104.

Thus, the bolt 114 is allowed, within the spherical washer 102, about a variety of axes. This freedom of movement helps to relieve bending stresses (moments) placed on the bolt 114. However, the male half 104 is not coupled to the female half 106. Thus, the male half 104, which is coupled to the bolt 114 in a tertiary configuration, may rotate about the bolt axis (e.g., axis A-A') away from the female half 106. Rotation about this axis (A-A') may permit the bolt 114 to rotate out of the spherical washer 102 and thereby to extract itself (to varying degrees) from the flange to which it is coupled. This extraction from the flange may cause the bolt 114 to deform as well as to rotate away from the flange, thereby disassembly the entire flange assembly (i.e., the two flanges coupled by the bolt 114 and spherical washer 102).

However, with regard to a spherical washer 102, as the bolt 114 rotates within the spherical washer 102, the bolt 114 may begin to extract itself from one of the flanges, for example, flange 302 and may be subject to increased bending stress as the flange 304 as well. Thus, the bolt 144, coupled to a spherical washer 102, may permit disassembly of the bolt 114 and flange system.

Figure 2A:
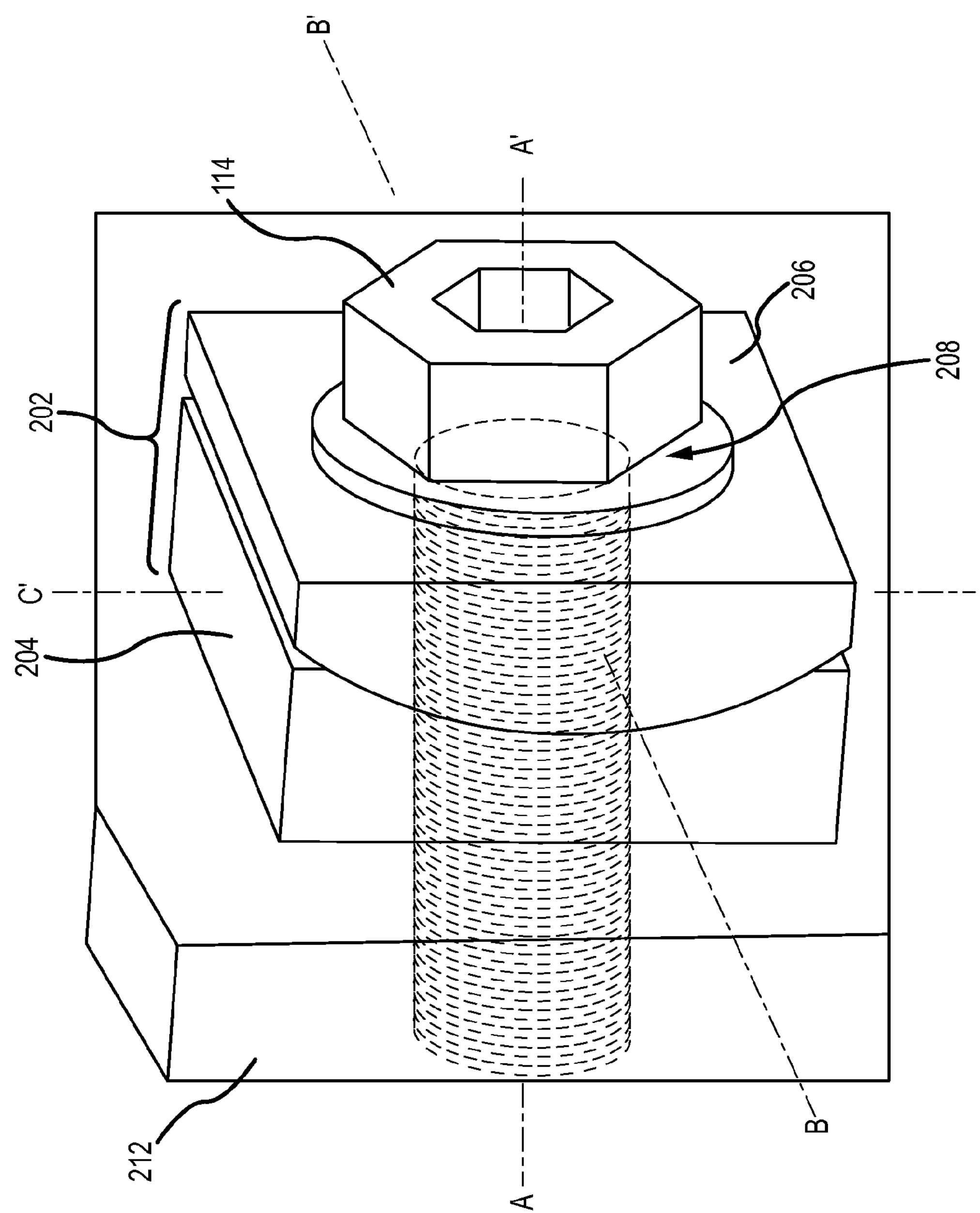
FIG. 2A illustrates, in accordance with various embodiments, a perspective view of a washer capable of preventing unwanted rotation of a bolt within the washer as well as providing moment relief on the bolt (a "barrel washer")
Figure 2B:
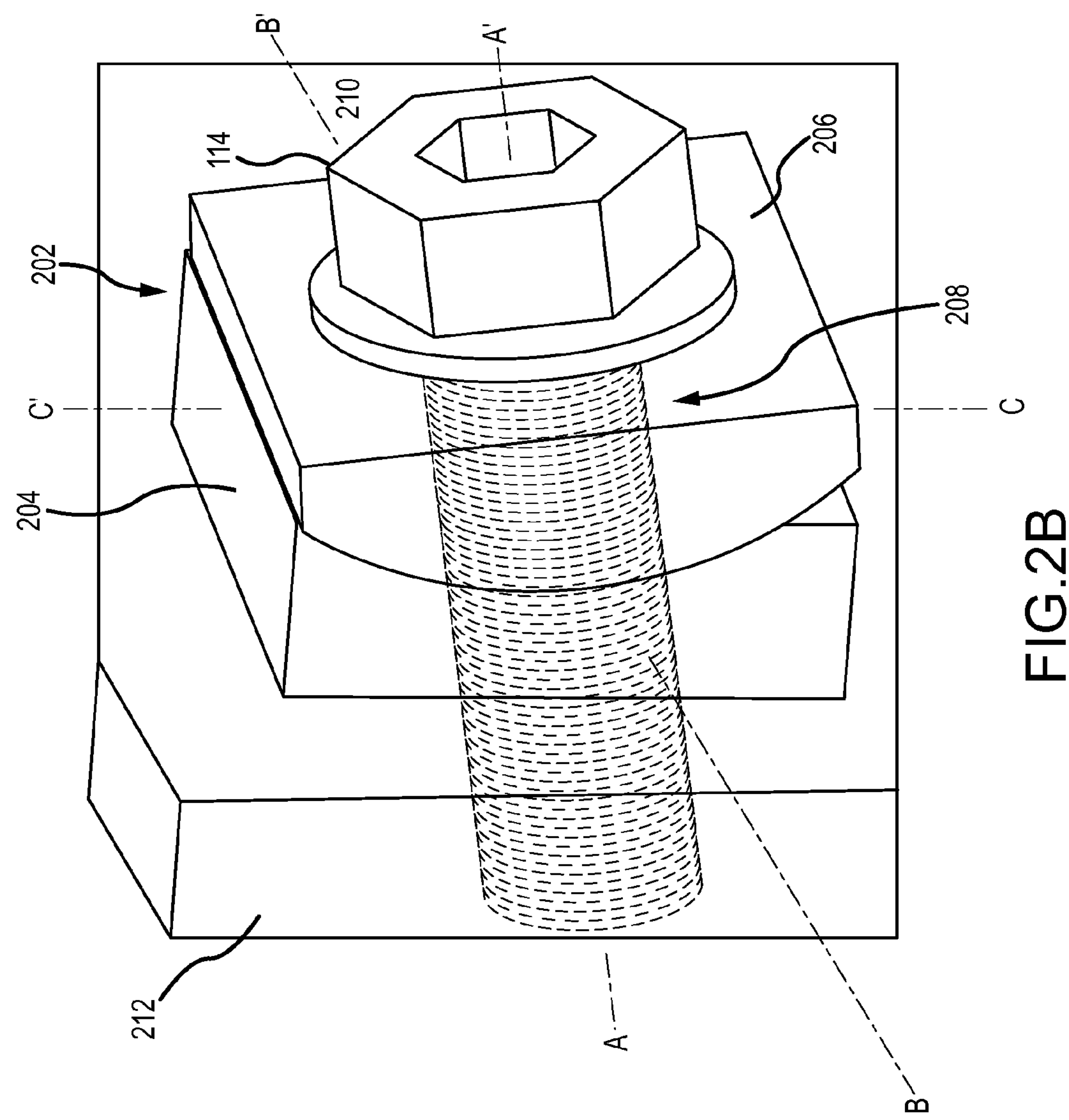
FIG. 2B illustrates, in accordance with various embodiments, a perspective view of a barrel washer portion pivoting about a single axis to relieve a moment experienced by the bolt as well as to prevent rotation by the bolt out of or away from the barrel washer.

Therefore, in various embodiments, and with reference to FIGS. 2A and 2B a perspective view of a barrel washer 202 capable of relieving bending stress about a single axis as well as rotating about a single axis B-B' is introduced. The barrel washer 202 may, like the spherical washer 102, relieve bending stresses. However, unlike the spherical washer 102, the barrel washer 202 may retain the bolt 114 in its proper orientation and position, thereby maintaining a proper distance and alignment between flange surfaces.

For example, as shown with respect to FIGS. 2A and 2B, such a barrel washer 202 may comprise a concave or female portion 204 (a "base") and a convex or male portion 206 (a "rocker"). The concave portion 204 may, in other words, comprise a base portion having a cutout or cutaway trough, while the convex portion 206 may comprise a rounded portion capable of fitting within and rocking about the axis B-B' within the concave cutaway portion 204.

A bolt 114 may be inserted through the aperture 208. In various embodiments, the surface of the concave portion 204 and/or the surface of the convex portion may be coated in a substance that facilitates motion therebetween, such as a lubricant. However, as opposed to the spherical washer 102 described above, the bolt 114 may be restricted by the barrel washer 202 to rotation about the axis B-B'.

A barrel washer 202 is shown in FIG. 2B in which the convex portion 206 has rocked or translated along the concave portion 204 to maintain proper orientation of a bolt 114 in response to a relative motion between two flanges. This motion of the convex portion 206 in response to the motion of the flanges relative to each other ensures that the bolt 114 does not experience excessive bending stress. It also ensures that the bolt 114 is unable rotate, as with the spherical washer 102, together with the male half 104, away from the flange 212. Thus, the barrel washer prevents disassembly of the barrel washer 202 and/or bolt from a flange 212 or flange system.

Figure 2C:
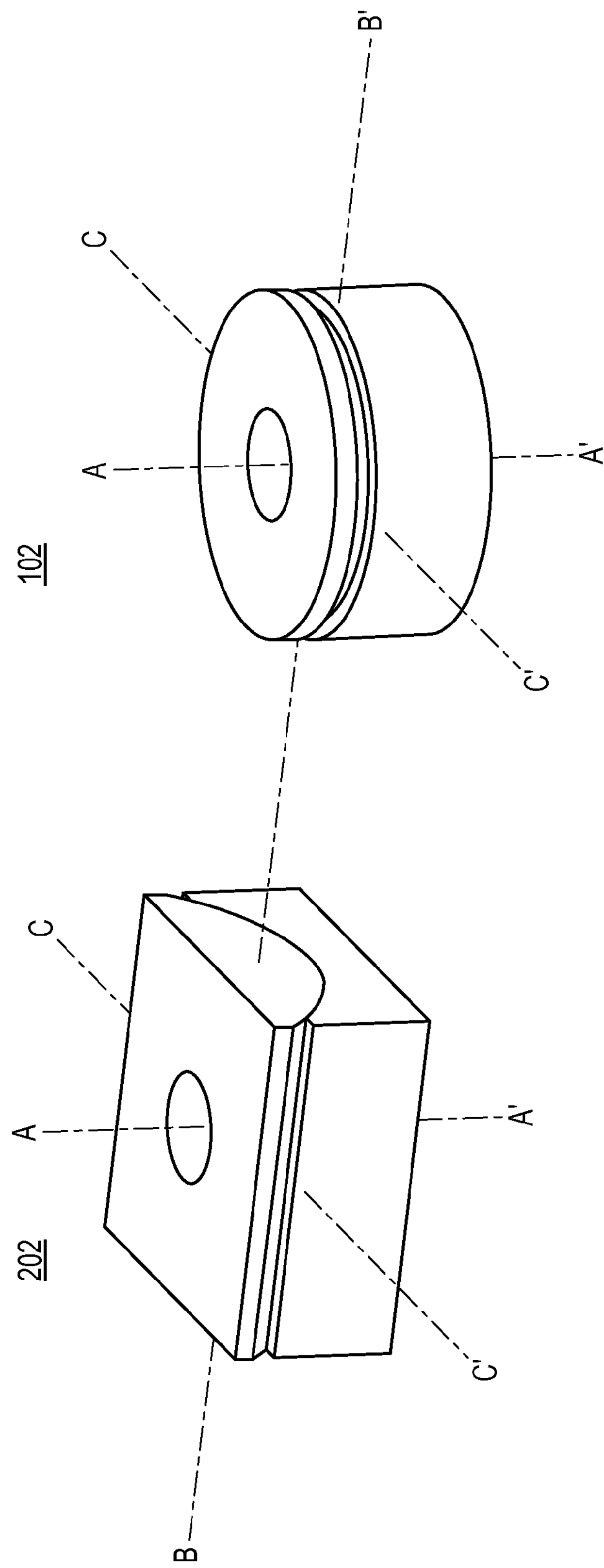
FIG. 2C illustrates, in accordance with various embodiments, a perspective view of a barrel washer and a perspective view of a prior art spherical washer and a first table describing the axes about which the barrel washer and spherical washer may rotate and a second table describing the axes along which the barrel washer and spherical washer may translate.

Accordingly, with attention to FIG. 2C, a barrel washer 202 is shown in comparison with a spherical washer 102. FIG. 2C is presented here for the purpose of illustrating the differences between the spherical washer 102 and the barrel washer 202. As shown, each of the spherical washer 102 and the barrel washer 202 are aligned with respect to the three axes, A-A', B-B', and C-C'. The two tables, Table 1 and Table 2, describe how each washer 102 and 202 may move about and in relation to each axis.

As shown with respect to Table 1, the barrel washer 202 may rotate about the axis B-B', but may not rotate about the remaining axes A-A' and C-C'. The spherical washer 102 may rotate about all of the axes A-A', B-B', and C-C'. That male portion 104 of the spherical washer 102 may rotate about the axis A-A' may, as described herein, permits a bolt 114 coupled to the spherical washer 102 to rotate about the axis A-A' as well, which may, as described herein, lead, ultimately, to the deformation of the bolt 114 due to bending stresses induced in the bolt 114. Rotation of the bolt 114 about the bolt axis (e.g., A-A') within the spherical washer may also permit the bolt 114 to extract itself from a flange to which is otherwise coupled.

In addition, as shown with respect to Table 2, the barrel washer 202 may translate, in various embodiments, along the axis B-B', while the spherical washer 102 may not permit translation along any of the axes A-A', B-B', and C-C'. This degree of freedom may help the barrel washer 202 to accommodate motion or translation along the axis B-B'.

Figure 3:
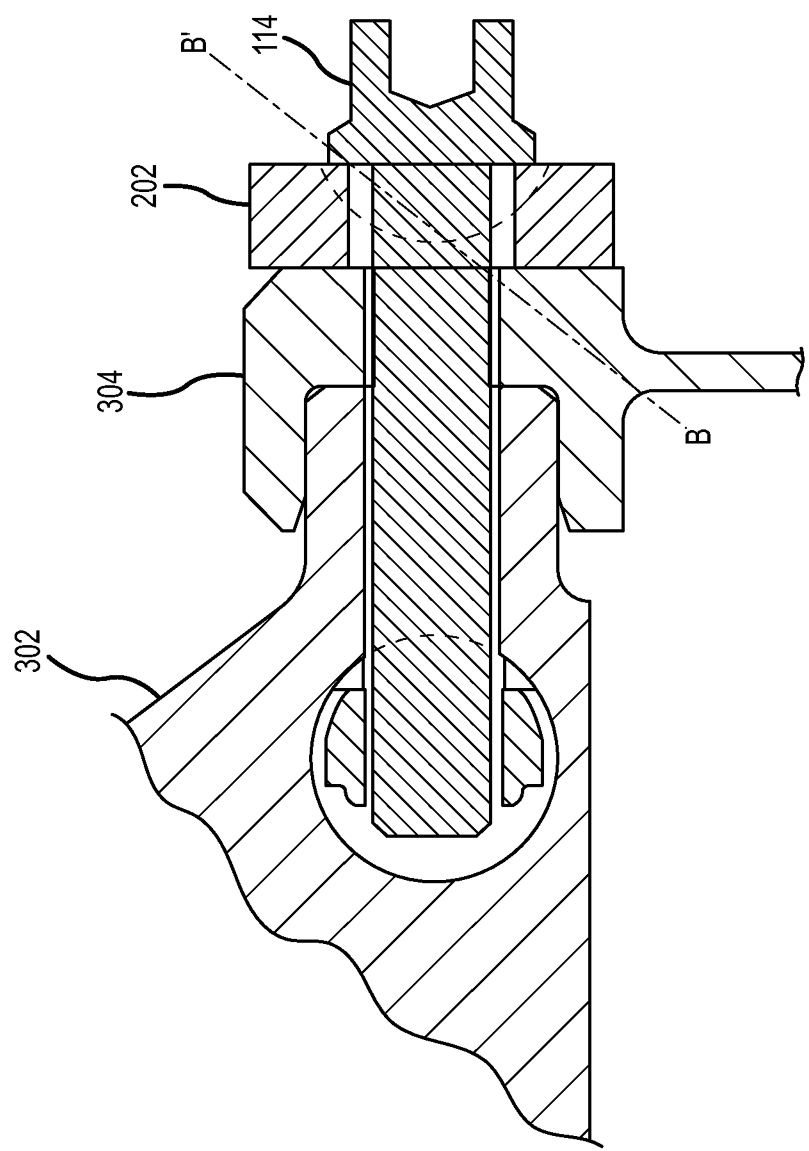
FIG. 3 illustrates a cross-sectional view of a bolt coupled to a barrel washer.

FIG. 3A illustrates a cross-sectional view of a bolt 114 coupled by a barrel washer 202 to a first flange 302 and a second flange 304. As shown, the barrel washer 202 may be fitted over the bolt 114 (and coupled to the flange 304) to permit relative motion between the flange 302 and the flange 304 such that the bolt 114 is able to rotate in response to relative motion between the flanges 302 and 304, thereby maintaining the integrity of the bolt 114 (and preventing bending of the bolt 114) as well as disassembly of flange 302 from flange 304.

As described above, this result may be accomplished by allowing the male portion 206 to rock within or pivot with the female portion 204 of the barrel washer 202 about the axis B-B'. Accordingly, as a bolt 114 inserted in the barrel washer 202 experiences bending stresses and/or vibration tending to shake the bolt 114 loose from its location within the barrel washer 202, the bolt 114 may be restricted to rotation about the axis B-B' (but may not be allowed to rotate about the axis A-A', nor may the barrel washer 202 permit rotation about the axis C-C'), thereby preventing rotation of the bolt 114 out of the barrel washer 202. In other words, the bolt 114 may be permitted by the barrel washer 202 to rock about the axis B-B', but by design, the barrel washer 202 may prevent the bolt 114 from rotating about the remaining axes (B-B' and C-C') within the barrel washer 202, which may, in turn, prevent the bolt 114 from rotating about the axis A-A' (or the bolt axis) out of or away from the barrel washer 202.

Accordingly, while a spherical washer 102 may permit rotation about all of the axes A-A', B-B', and C-C', its flexibility in fact introduces or permits bending stress to occur in the bolt as well as disassembly of the bolt from a flange or flanges. The barrel washer 202, on the other hand, and by eliminating two degrees of freedom (e.g., rotation about the axes A-A' and C-C'), in fact permits the bolt 114 to accommodate relative motion between flanges and prevents the bolt from rotation out of the barrel washer 202.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A barrel washer comprising:

a convex portion having a convex surface that is curved about a single axis and a first planar surface opposite the convex surface; and a concave portion having a concave surface that is curved about a single axis and a second planar surface opposite the concave surface, the concave portion configured to mate with the convex portion, such that the convex portion is only capable of rocking about a single axis within the concave portion.

2. The barrel washer of claim 1, wherein the barrel washer is configured to prevent a bolt from rotating about its longitudinal axis within the washer.

3. The barrel washer of claim 1, wherein the barrel washer is configured to relieve bending stress on the bolt.

4. The barrel washer of claim 1, wherein the concave surface of the concave portion is coated with a lubricant.

5. The barrel washer of claim 1, wherein the convex surface of the convex portion is coated in a lubricant.

6. The barrel washer of claim 1, wherein the concave surface of the concave portion comprises a cylindrical surface.

7. The barrel washer of claim 1, wherein the convex surface of the convex portion comprises a cylindrical surface.

8. The barrel washer of claim 1, wherein the barrel washer is configured relieve bending stress on the bolt as a first flange moves relative to a second flange.

9. A barrel washer configured to prevent a bolt coupled to the barrel washer from rotating about its longitudinal axis within the barrel washer, the barrel washer comprising:

a convex rocker comprising a cylindrical convex portion and a first planar portion opposite the cylindrical convex portion;

concave base comprising a cylindrical concave portion and a second planar portion opposite the cylindrical concave portion, the cylindrical convex portion configured to mate with the cylindrical concave portion to rock about a single axis such that the bolt is unable to rotate about its longitudinal axis within the barrel washer.

10. The barrel washer of claim 9, wherein a surface of the convex rocker is coated with a lubricant.

11. The barrel washer of claim 9, wherein a surface of the concave base is coated in a lubricant.

12. The barrel washer of claim 9, wherein the washer is configured to couple a bolt to a first flange and a second flange that are capable of changing orientation relative to one another.

13. The barrel washer of claim 9, wherein the barrel washer is configured to receive the bolt.

14. The barrel washer of claim 9, wherein the concave base comprises an aperture.

15. A system for preventing a bolt from rotating about its longitudinal axis within a barrel washer, the system comprising:

a first flange;

a second flange;

a bolt that extends between the first flange and the second flange;

a cylindrical concave portion coupled to the first flange;

a cylindrical convex portion seated in the concave portion, the cylindrical concave portion and the cylindrical convex portion together preventing the bolt from rotating about a bolt axis as the first flange translates relative to the second flange, wherein at least one of the convex portion and the cylindrical portion is coated in a lubricant.

16. The barrel washer of claim 15, wherein a surface of the convex portion is coated with a lubricant.

17. The barrel washer of claim 15, wherein a surface of the concave portion is coated in a lubricant.

18. The system of claim 15, wherein bolt is coupled at a first end to a first washer and at a second end to a second washer.

* * * * *